United States Patent [19]
Ayasli et al.

[11] Patent Number: 5,796,362
[45] Date of Patent: Aug. 18, 1998

[54] POST LAUNCH ON-BOARD IDENTIFICATION FRIEND OR FOE SYSTEM

[75] Inventors: Yalcin Ayasli, Lexington; Peter Katzin, Arlington, both of Mass.

[73] Assignee: Hittite Microwave Corporation, Woburn, Mass.

[21] Appl. No.: 258,966

[22] Filed: Jun. 13, 1994

[51] Int. Cl.$^6$ .................... H01Q 15/00; G01S 13/78
[52] U.S. Cl. ........................................ 342/6; 342/45
[58] Field of Search ............................ 342/1, 6, 45

[56] References Cited

U.S. PATENT DOCUMENTS

| | | | |
|---|---|---|---|
| 4,117,485 | 9/1978 | Gorr et al. | 343/18 E |
| 4,155,087 | 5/1979 | Okrent | 343/716 |
| 4,694,297 | 9/1987 | Sewards | 342/45 |
| 5,223,839 | 6/1993 | Grossman | 342/43 |
| 5,274,379 | 12/1993 | Carbonneau et al. | 342/45 |

*Primary Examiner*—Peter A. Nelson
*Attorney, Agent, or Firm*—Iandiorio & Teska

[57] ABSTRACT

A post launch identification friend or foe fire control system for a munition has an identification and ranging interrogation unit for mounting on a munition. The interrogation unit transmits an interrogation unit which detects and verifies an incoming identification code from a remote transponder unit in reply to the interrogation code. The range of the remote transponder is determined and a decision signal is provided to the fire control circuit of the munition to enable it to avoid a friendly target; a transponder unit receives the rf carrier signal containing an incoming interrogation code from an interrogation unit on board a munition, validates the incoming interrogation code, and extracts a timing signal from it. An identification code is synchronously generated with the incoming interrogation code using the timing signal. The synchronized identification code is then transmitted back to the interrogation unit on board the munition to confirm the identification of the transponder unit and its range.

16 Claims, 4 Drawing Sheets

POST LAUNCH ON-BOARD IDENTIFICATION FRIEND OR FOE SYSTEM

FIELD OF INVENTION

This invention relates to a post launch, on-board identification friend or foe (IFF) system, and more particularly to such a system which is compatible with the fusing mechanism to defuse or pre-detonate a munition upon recognition of a transponder unit carried by friendly forces.

BACKGROUND OF INVENTION

To prevent firing on friendly forces in today's battlefields with multinational forces, high-speed operations, and high-tech weapons and equipment, there is a critical need for identification friend or foe (IFF) techniques. The Army initiative for the Battlefield Combat Identification System (BCIS) addresses this need in the pre-launch situation. But with the increasing deployment of smart-munitions, sub-munitions, and long range guns and missiles there is an increasing need for a low-cost, compact post-launch IFF system on board the munitions so that friendly forces can be quickly identified and avoided by in-flight munitions. While this is less of a problem with regard to established friendly installations whose location is known and which have their own detection and defensive capability, it is a very severe problem with trucks and armored vehicles, mobile gun emplacements and individual foot soldiers whose specific whereabouts are unknown and who have no means of advance detection or warning and have no special defense.

SUMMARY OF INVENTION

It is therefore an object of this invention to provide a post launch, fire control on-board IFF system.

It is a further object of this invention to provide such a system which uses an on-board interrogation unit and a mobile transponder unit which can be hand carried or mounted on mobile platforms, which units are small, low cost, lightweight and compact.

It is a further object of this invention to provide such a system which operates independently of any centralized system, and does not require a high-accuracy time base.

It is a further object of this invention to provide such a system which can be easily integrated with the on-board munitions to defuse or pre-detonate the munition if friendly forces are detected in the target area.

It is a further object of this invention to provide such a system which can be made to provide covertness and operational security by using minimum signal levels, spread spectrum modulation and encryption code keys which can be changed easily and routinely.

It is a further object of this invention to provide such a system which operates independently of weather and battlefield conditions such as obscurants and terrain.

It is a further object of this invention to provide such a system which operates independent of firing range and functions as well over the horizon.

It is a further object of this invention to provide such a system which can be miniaturized at low cost using GaAs and Si IC technology and which is compatible with IC-based proximity sensors.

It is a further object of this invention to provide such a system which is compatible with use of either directional or broad-beam (omni-directional) rf antennae.

It is a further object of this invention to provide such a system which is additionally covert in operation because the on-board interrogation unit only broadcasts intermittently and the transponder unit only responds when it senses the presence of a host munition bearing an on-board interrogator unit.

The invention results from the realization that a truly effective post launch IFF fire control system can be achieved with an on-board interrogation unit that interrogates a remote transponder unit and stimulates it to validate the interrogation code and return a synchronized identification code which the interrogation unit in turn validates and uses to determine the relative distance and velocity between the two units from which a decision can be made to pre-detonate, defuse or redirect the munition.

This invention features a post launch identification friend or foe (IFF) fire control system for a munition including an identification and ranging interrogation unit for mounting on a munition. There are means for transmitting interrogation code on an rf carrier signal and means for detecting and verifying an incoming identification code from a remote transponder unit in reply to the interrogation code. There are also means for determining the range and relative velocity of the remote transponder unit and means for providing a decision signal to the fire control circuit of the munition to enable friendly target avoidance.

In a preferred embodiment the means for transmitting may include an interrogation code generator and means for modulating the interrogation code on the rf carrier signal. The means for detecting and verifying may include an identification code generator, clock means and demodulator means for time shifting the identification code generator output to determine a match between it and the incoming identification code. The means for determining the range may include a range measurement circuit responsive to the identification code generator and the interrogation code generator for measuring the time delay between the identification code and interrogation code representative of the distance between the interrogation unit and the transponder unit.

The invention also features a post launch identification friend or foe (IFF) fire control system for a munition which includes a transponder unit having means for receiving an rf carrier signal containing an incoming interrogation code from a remote interrogation unit on board a munition and means for validating the incoming interrogation code. There are means for extracting a timing signal from the validated incoming interrogation code and means for generating an identification code synchronized by the timing signal with the incoming interrogation code. There are also means for transmitting the synchronized identification code back to the interrogation unit on board the munition for confirming identification and range of the transponder unit.

This invention also features a post launch, identification friend or foe (IFF) fire control system for a munition including a transponder circuit and an interrogation unit having an identification and ranging interrogation circuit for mounting on a munition including means for transmitting an interrogation code on an rf carrier signal; means for detecting and verifying, in reply to the interrogation code, an incoming identification code from the transponder unit, means for determining the relative range and velocity of the transponder unit, and means for providing a decision signal to the fire control circuit of the munition to enable friendly target avoidance.

The transponder unit has means for receiving an rf carrier signal containing an incoming interrogation code from the remote interrogation unit on board a munition; means for validating the incoming interrogation code; and means for extracting a timing signal from said validated incoming interrogation code. The transponder also has means for generating an identification code synchronized by the timing signal with the incoming interrogation code; and means for transmitting the synchronized identification code back to the interrogation circuit on board the munition for confirming identification and range of the transponder unit.

DISCLOSURE OF PREFERRED EMBODIMENT

Other objects, features and advantages will occur to those skilled in the art from the following description of a preferred embodiment and the accompanying drawings, in which.

Figure 1:
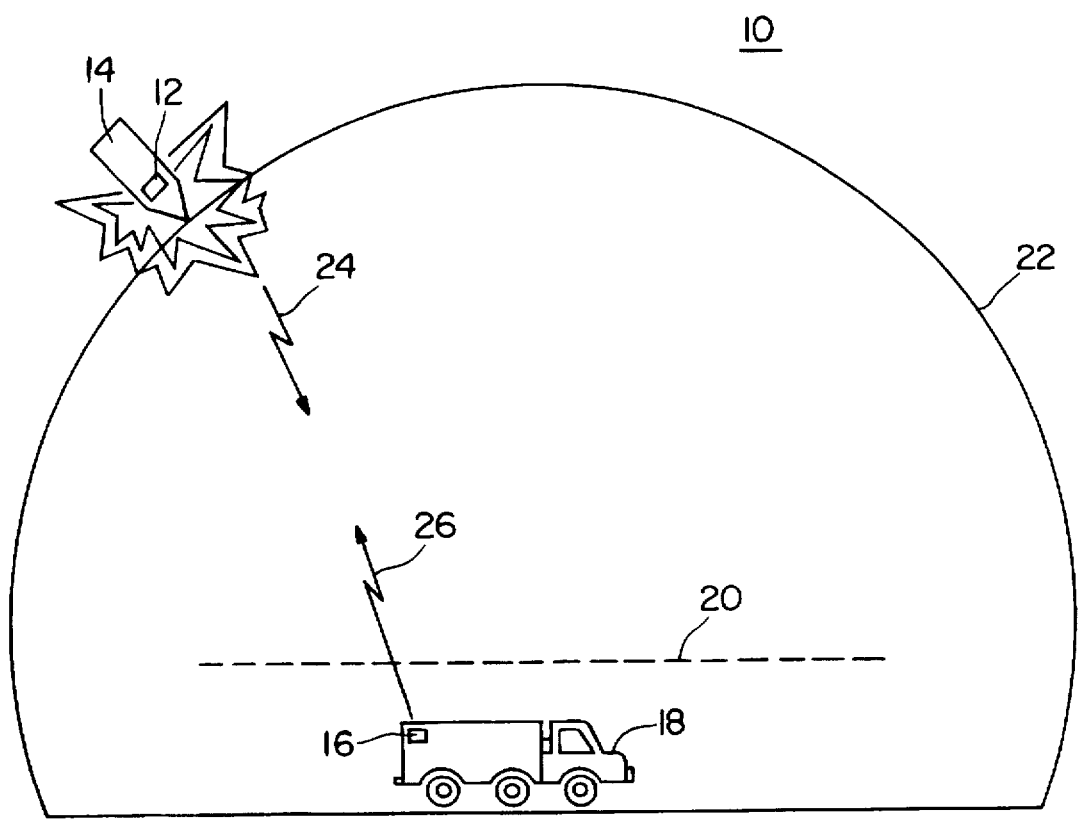
FIG. 1 is a schematic diagram of field deployed interrogation and transponder units according to this invention.

There is shown in FIG. 1 a post-launch identification friend or foe (IFF) fire control system 10 including an interrogation unit 12 on board a munition 14 such as a missile, and a transponder unit 16 which can be carried by friendly forces on a vehicle 18 or other equipment or carried by individual personnel. Typically missile 14 is set to detonate at some fixed height above ground, for example at the dashed line 20 representing twenty meters above ground level. However, with this invention a dome of safety 22 at for example 450 meters may be set to protect friendly forces. This is done using interrogation unit 12 to periodically transmit an interrogation code 24 which is received, decoded and used to provide a reply identification code 26 which is used to identify transponder unit 16 as a valid transponder unit associated with friendly forces and to indicate the range and range-rate of transponder unit 16, that is, its distance and relative velocity with respect to missile 14 and on-board interrogation unit 12. If it is determined that missile 14 is heading toward the vehicle 18 and the distance between missile 14 and vehicle 18 is at 450 meters or beyond, the command to pre-detonate will be given in order to protect the friendly forces 18. If the missile is already within the 450 meter dome of safety 22, then the command would be to disarm the missile so that it will not detonate.

The sequence of operation is depicted in Table I, which is an example of an actual operating condition for the system.

TABLE I

| Munition (M) or Ground (G) | Step Sequence | Action | Time (Before Impact) | Distance |
| --- | --- | --- | --- | --- |
| M | 1 | Interrogation Unit Activates | 4 sec | 1.5 km |
| M | 2 | Interrogation Unit Transmits periodic interrogation code | 3 sec | 1.2 km |
| G | 3 | Transponder detects valid interrogation code and sends its own ID code | 1 sec | 490 m |
| M | 4 | Interrogation unit checks the validity of the received ID code and determines heading and distance to transponder | 0.95 sec | 475 m |
| M | 5 | Self destruct if there is sufficient safe distance | 0.9 sec | 450 m |
| or M | 5' | Deactivate fuse to become dud if measured distance is less than a predetermined value | 0.9–0.07 sec | <450 m |

There is a sequence of five or possible six steps as indicated in the table. The first column indicates where the action takes place, the munition (M) or ground (G). The second column indicates the step sequence. The third column indicates the action that takes place; the fourth column indicates the time, and the fifth, the distance between the interrogation unit and the transponder unit. Thus it can be seen that in step 1 the munition interrogation unit activates at four seconds before impact with a distance of 1.5 km between the interrogation unit and transponder unit. In step 2, in the munitions the interrogator unit transmits with three seconds left before impact and the distance remaining at 1.2 km. Following this in step 3, the transponder on the ground detects a valid interrogation code and sends back its own ID code. At this point there is one second left and the distance is now 490 m. In the fourth step the interrogation unit on board the munition checks the validity of the received ID code from the transponder and determines its heading and distance relative to the transponder. There is now 0.95 second left and 470 m between the interrogation unit and transponder unit. In the fifth step the munitions self destruct if there is sufficient distance at 0.9 second and 450 m, which is the boundary of the safety dome 22 in FIG. 1. Alternatively, in step 5', the munitions may be commanded to deactivate the fuse to become a dud if the measured distance is less than a predetermined value, for example less than the 450 m dome of safety 22.

Figure 2:
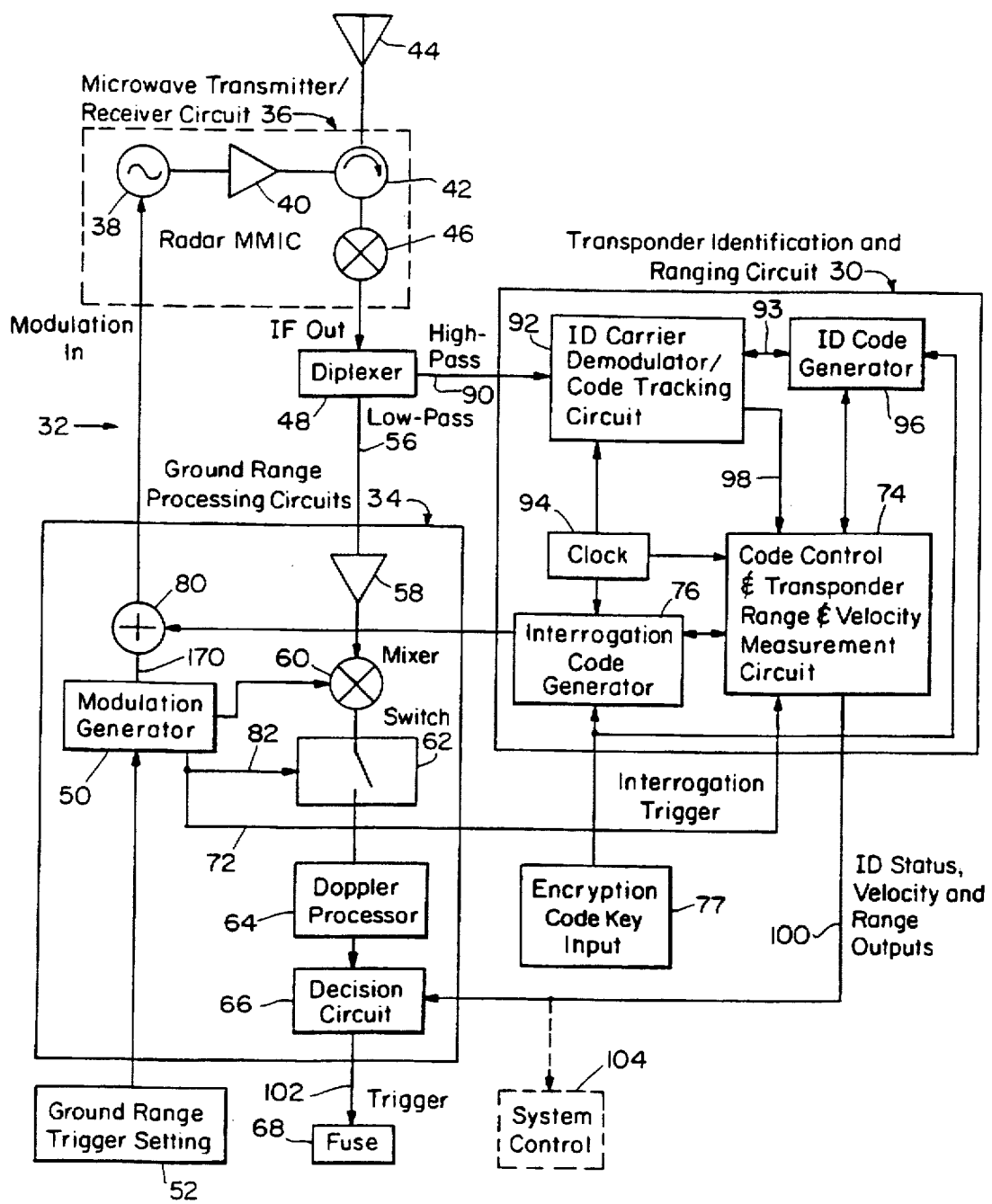
FIG. 2 is a schematic block diagram of the interrogation unit of FIG. 1 used in conjunction with a ground ranging circuit.

Interrogation unit 12, FIG. 2, includes a transponder identification and ranging circuit 30 in accordance with this invention combined with a fire control circuit 32 that includes a ground range measurement circuit 34 and a microwave transmitter/receiver 36. Transponder identification and ranging circuit 30 is preferably implemented using Gallium Arsenide or Silicon IC technology, which are compatible with ground range circuit 34 and modulator/demodulator transmitter/receiver 36 which are implemented using Silicon and Gallium Arsenide IC's, respectively. Microwave transmitter/receiver 36 includes a voltage controlled oscillator 38 that generates a 5 GHz carrier signal whose output is delivered through rf amplifier 40 to microwave circulator 42. Circulator 42 feeds transmitter/receiver antenna 44 which transmits a modulated 5 GHz carrier signal. Antenna 44 also receives incoming signals, which will be shifted in frequency by about 0.2 GHz (to 5.2 GHz) when they originate from transponder unit 16, FIG. 1. The return signal is fed to circulator 42 and mixed in mixer 46 with the original 5 GHz signal from amplifier 40 to provide an IF signal to diplexer 48. Ground range circuit 34 includes modulation generator 50 which is set by means of ground range trigger setting circuit 52 to provide a detonation signal at a particular ground range, i.e., at 20 m in FIG. 1. With this setting modulation generator 50 inserts a transponder frequency modulating signal of 50–500 KHz, for example 100 KHz, which is delivered to VCO 38 to modulate the 5 GHz radio frequency signal. The IF signal, the frequency of which is the difference between the 5 GHz modulated transmitted signal and the received signal, is delivered to diplexer 48.

Figure 3:
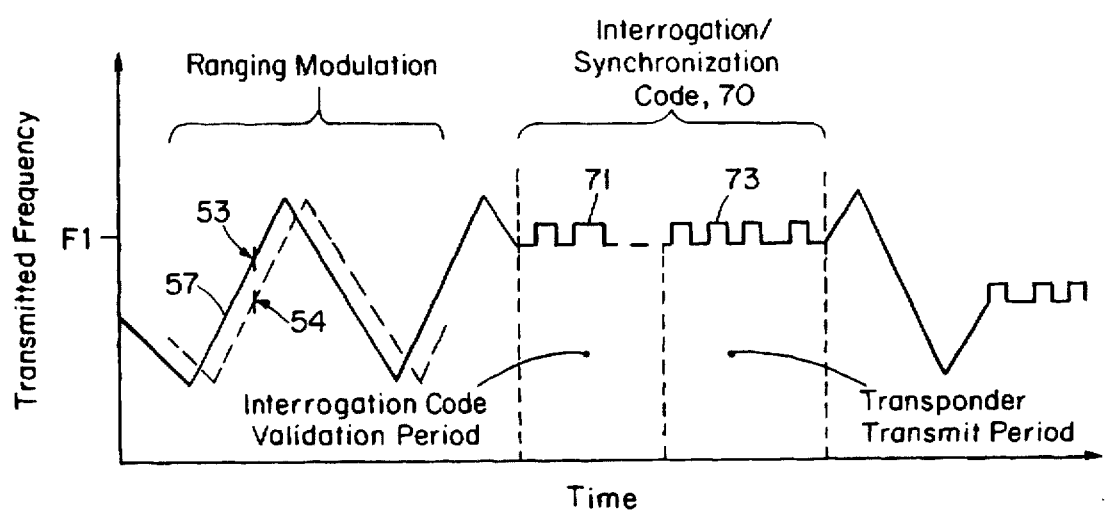
FIG. 3 is an illustration of the ground-ranging and interrogation code modulation waveforms broadcast by the interrogation unit of FIG. 1.

In a normal ground ranging mode of operation, the frequency of the modulated 5 GHz signal transmitted from antenna 44 appears as shown in FIG. 3 at waveform 57. Any delay in the received modulation waveform with respect to the transmitted waveform indicates the range to ground. For example, if the transmitted frequency was as shown at 53 and the return signal frequency as shown at 54, the instantaneous frequency difference of which is the vertical separation between 53 and 54 in FIG. 3, is detected by mixer 46 as the IF output. Diplexer 48 delivers this signal through its low pass output 56 to amplifier 58, FIG. 2. The output from amplifier 58 is mixed in mixer 60 with the other input from modulation generator 50 whose frequency corresponds to the height above ground at which detonation is normally to occur. When the two signals have the same frequency range a large output is produced from mixer 60 which is transmitted through switch 62 in the closed position to Doppler processor 64. Doppler processor serves to validate the ranging signal: that is, it uses the Doppler effect caused by the motion of the munition towards ground to discriminate against any false or jamming signals that may be occurring. When the munition is within firing range of the ground, a signal is provided to decision circuit 66 which will then provide a trigger pulse on lines 102 to fuse 68. In accordance with this invention, periodically during the identification friend or foe mode of operation, modulation generator 50 interrupts its normal ground ranging output, waveform 57, FIG. 3, to allow interrogation code generator 76 in the transponder ranging and interrogation unit 30 to modulate an interrogation code 70, which typically includes an initial synchronization code followed by a pseudo-random spectrum-spreading code. This interrogation code is triggered by modulation generator 50 on line 72, through the control and transponder range measurement circuit 74. The particular code used in interrogation code generator 76 may be changed manually, periodically, or automatically using an encryption code input 77. This code is combined in summer 80, FIG. 2, with the modulating signal from modulation generator on line 170, which is held at a constant voltage level during the transmission of interrogation code 70. At this point a signal from modulation generator 50 on line 82 also opens switch 62 so that Doppler processor 64 is isolated the circuit and will not be confused by signals returned by the transponder unit 16, FIG. 1.

Figure 5:
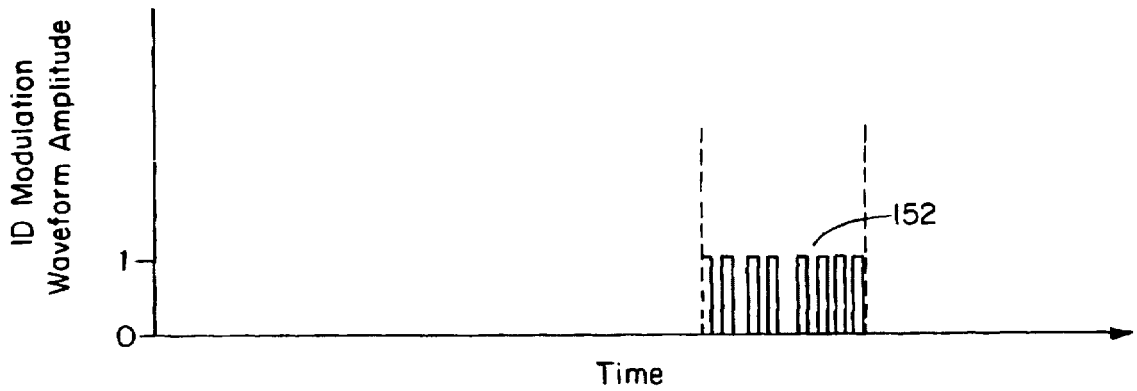
FIG. 5 is an illustration of the transponder identification code modulation waveform which is superimposed on the broadcast modulation waveform shown in FIG. 4.

When transponder unit 16, FIG. 1, receives and validates the interrogation code 71, FIG. 3, it generates in reply an identification (ID) phase-modulation code, FIG. 5, which is superimposed on the 5 GHz carrier that has been shifted a specific amount, for example, 0.2 GHz to 5.2 GHz. The returning 5.2 GHz signal is received by antenna 44, FIG. 2, and through circulator 42 is combined in mixer 46 with the original 5 GHz carrier signal from VCO 38. Now the IF frequency is 0.2 GHz, modulated with the transponder ID code 152, and this signal is delivered by diplexer 48 along the high-pass path 90 to the ID carrier demodulator and code tracking circuit 92, which validates the returning ID code and time-shifts the input from clock 94 to ID code generator 96 to determine whether there is a match between the incoming ID code 152, FIG. 5, on line 90 and the ID code from generator 96 on line 93. If there is, a signal on connection 98 is provided to code control and transponder range measurement circuit 74. At this time circuit 74 compares the delay between the code from generator 96 and the interrogation code from generator 76 to determine the distance between the transponder unit 16 and the interrogation unit 12. Carrier demodulation and code tracking circuit 92 also tracks the doppler frequency-shift in the 0.2 GHz IF signal due to the relative motion between interrogator 12 and transponder 16 in FIG. 1. This doppler frequency-shift is directly proportional to the relative velocity between the interrogator and transponder, so the value of this frequency shift provides a measurement of the relative velocity. This velocity measurement allows the decision circuit 66 in FIG. 2 to establish the heading of the interrogator with respect to the transponder by combining it with a knowledge of the speed of missile 14 in FIG. 1. For instance, if the relative velocity is equal to the estimated speed of the missile, then the missile must be heading straight toward the transponder 16 in FIG. 1. If the relative velocity is significantly less than the estimated speed of the missile, it is then not heading straight toward the transponder, and it would not be necessary to pre-detonate or deactivate the fuse. When the ID code has been validated, the distance and relative velocity between the transponder unit 16 and interrogation unit 12 is delivered on connection 100 to decision circuit 66. Decision circuit 66 then indicates with a signal on line 102 whether to trigger or disarm fuse 68. Alternatively, when for example the identification and ranging interrogation unit 12 is not associated with a ground range circuit the signal may be sent to a system control 104 which may for example redirect or turn the missile to another direction.

Figure 4:
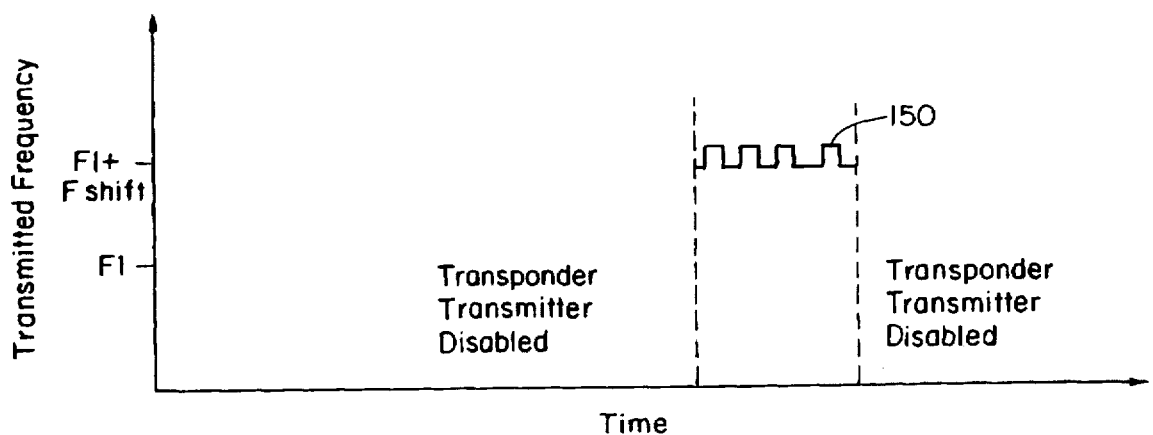
FIG. 4 is an illustration of the returned interrogation modulation code waveform broadcast from the transponder unit of FIG. 1.
Figure 6:
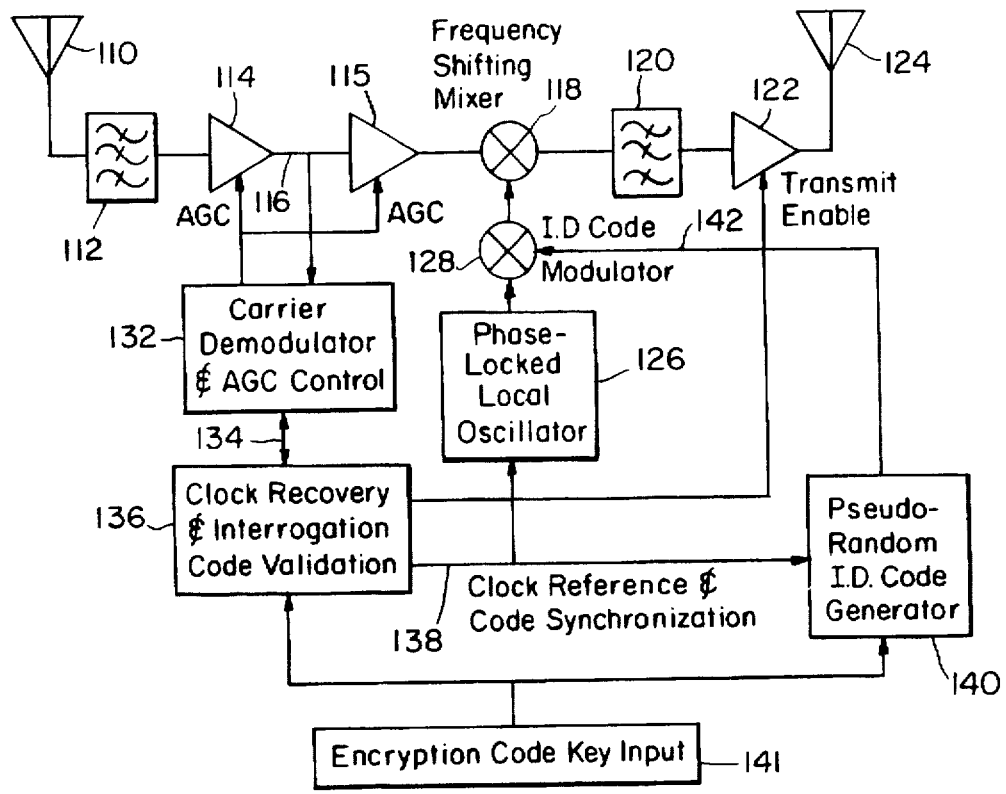
FIG. 6 is a detailed block diagram of the transponder unit of FIG. 1.

Transponder unit 16, FIG. 6, receives on antenna 110 the 5 GHz interrogation code which passes through filter 112 and automatic gain control amplifier 114. The 5 GHz signal on line 116 at the output of AGC amplifier 114 is fed to another AGC amplifier 115, the output of which is fed to a frequency shifting mixer 118, then through an output filter 120 and output amp 122 to the transmitter antenna 124. Phase-locked oscillator 126 provides an up-conversion signal through phase modulator 128 to mixer 118 that shifts the 5 GHz carrier signal on line 116 to, for example, 5.2 GHz, thus maintaining the frequency modulation coherency of the output carrier transmitted on antenna 124 with the input carrier received on antenna 110. The carrier demodulator AGC control 132 generates a gain control signal, based on the amplitude of received carrier signal. This gain control signal is fed to the AGC amplifier 114 through line 130 so as to keep the signal amplitude approximately constant on line 116. The same gain control signal is fed to AGC amplifier 115, which is identical to 116, so that the ID reply signal transmitted through antenna 124 will have a level inversely proportional to the carrier signal level received through antenna 110. In this way, the transponder automatically provides an optimum reply signal level, which should be large enough to be properly received by the interrogator for large separations, but should not be any larger than necessary for small separations so as to minimize the probability of the transponder reply being detected by an unfriendly interceptor. The interrogation code detected by carrier demodulator and AGC control 132 is delivered on line 134 to the clock recovery and interrogation code validation circuit 136 which validates the interrogation code and extracts timing control signals from the interrogation code. Once the interrogation code is validated the accompanying clock and synchronization signals are delivered on line 138 to initialize pseudo-random ID code generator 140. This results in the generation of an ID reply code 150, FIG. 4, from transponder 16 in response to the interrogation code 71 from interrogation unit 12. The use of the interrogator code to synchronize the ID reply code allows the distance between the two units to be determined, so their separation can be compared to the dome of safety 22 to determine whether an avoidance mode must be entered and what form that mode may take, i.e., disarm, predetonate or redirect. The ID code generator 140 provides its output on line 142 to mixer 128 where it is combined with the sine wave output from phase locked local oscillator 126 , which is synchronized to the interrogation code clock signal through line 138, so that the shifted carrier at e.g. 5.2 GHz is modulated with the ID code 150. The ID code 150 is actually in this embodiment a phase modulation of a pseudo-random code 152, FIG. 5, superimposed on the interrogation code 73, FIG. 3. Encryption code key input 141 enables routine manual or automatic changing of the pseudo-random code for the interrogation code and the ID code.

Figure 7:
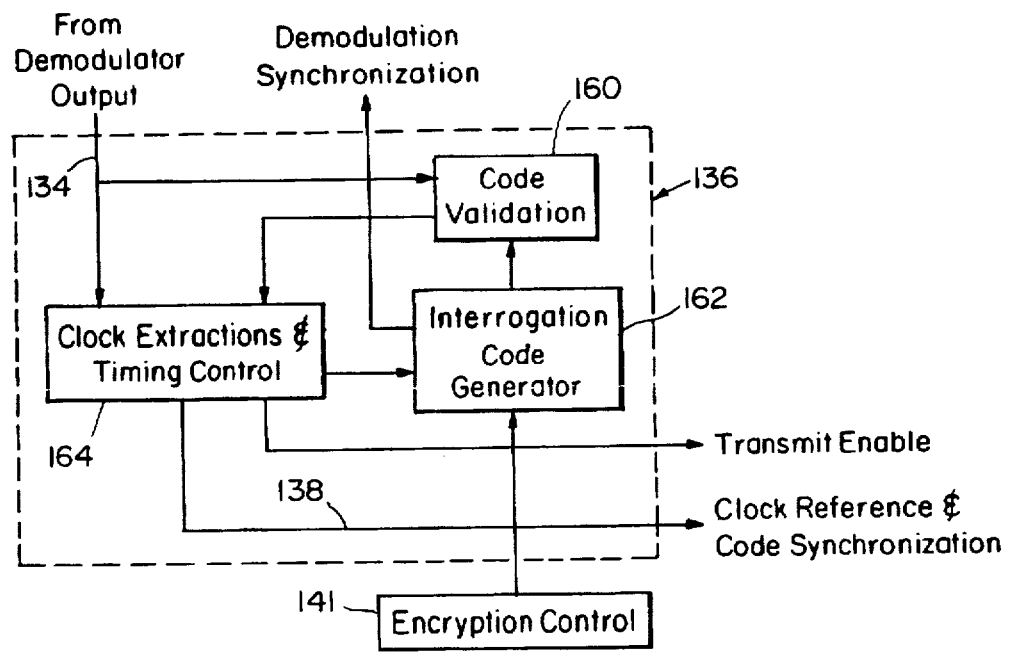
FIG. 7 is a more detailed schematic block diagram of the clock recovery and interrogation code validation circuit of FIG. 4.

Clock recovery and interrogation code validation circuit 136 includes a code validation circuit 160, FIG. 7, which compares the incoming interrogation code on line 134 with the internal interrogation code generated by interrogation code generator 162. Clock extraction and clock control circuit 164 extracts the timing information from the incoming interrogation code on line 134 and combines it with the code validation signal from 160 which provides a "time mark" for synchronization once a valid interrogation code is detected. Then clock extraction and timing control circuit 164 provides the timing signals on line 138 to synchronize the production of the identification code in identification code generator 140. It also enables the output amplifier 122, FIG. 6, to allow transmission of the identification signal.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A post launch, identification friend or foe (IFF) fire control system for a munition comprising: an identification and ranging interrogation circuit for mounting on a munition including means for transmitting an interrogation code on an rf carrier signal; means for detecting and verifying, in reply to said interrogation code, an incoming identification code from a remote transponder unit, means for determining the range and velocity with respect to the remote transponder unit, and means for providing a decision signal to the fire control circuit of the munition to enable friendly target protection.

2. The system of claim 1 in which said means for transmitting includes an interrogation code generator and means for modulating said interrogation code on said rf carrier signal.

3. The system of claim 2 in which said means for detecting and verifying includes an identification code generator, clock means and demodulator means for time shifting said identification code generator output to determine a match between it and said incoming identification code.

4. The system of claim 3 in which said means for determining the range includes a range measurement circuit, responsive to said identification code generator and said interrogation code generator, for measuring the time delay between said identification code and interrogation code representative of the distance between said interrogation circuit and transponder circuit.

5. The system of claim 3 which includes means for determining the relative speed between interrogator and transponder, using doppler shift of the identification rf carrier signal.

6. A post launch, identification friend or foe (IFF) fire control system for a munition comprising:
   a transponder unit having means for receiving an rf carrier signal containing an incoming interrogation code from a remote interrogation unit on board a munition;
   means for validating the incoming interrogation code;
   means for extracting a timing signal from said validated incoming interrogation code;
   means for generating an identification code synchronized by said timing signal with said incoming interrogation code; and
   means for transmitting said synchronized identification code back to said interrogation circuit on board the munition for confirming identification and relative range and speed of the transponder unit.

7. The system of claim 6 in which said means for validating includes an interrogation code generator and code validation means for comparing said incoming interrogation code with the interrogation code from said interrogation code generator.

8. The system of claim 6 in which said means for extracting a timing signal includes a clock extractor circuit.

9. The system of claim 6 in which said means for generating a synchronized identification code includes an identification code generator responsive to said timing signal.

10. The system of claim 6 in which said means for transmitting includes frequency shifting means for shifting the frequency of said received carrier signal to create a transmit carrier signal, and means for modulating said transmit carrier signal with said synchronized identification code.

11. A post launch, identification friend or foe (IFF) fire control system for a munition comprising:

a transponder unit;

an interrogation unit having an identification and ranging interrogation circuit for mounting on a munition including means for transmitting an interrogation code on an rf carrier signal; means for detecting and verifying, in reply to said interrogation code, an incoming identification code from said transponder unit, means for determining the range and velocity to said transponder unit, and means for providing a decision signal to the fire control circuit of the munition to enable friendly target avoidance;

said transponder unit having means for receiving an rf carrier signal containing an incoming interrogation code from said interrogation unit on board a munition; means for validating the incoming interrogation code; means for extracting a timing signal from said validated incoming interrogation code; means for generating an identification code synchronized by said timing signal with said incoming interrogation code; and means for transmitting said synchronized identification code back to said interrogation circuit on board the munition for confirming identification and range of the transponder unit.

12. A post launch, identification friend or foe (IFF) fire control system for a munition comprising:

an identification and ranging interrogation circuit for mounting on a munition including means for transmitting an interrogation code on a low power continuous wave rf carrier signal;

means for detecting and verifying, in reply to said interrogation code, an incoming identification code from a remote transponder unit;

means for determining the range and velocity with respect to the remote transponder unit; and means for providing a decision signal to the fire control circuit of the munition to enable friendly target protection.

13. A post launch, identification friend or foe (IFF) fire control system for a munition comprising:

a transponder unit having means for receiving a low power continuous wave rf carrier signal containing an incoming interrogation code from a remote interrogation unit on board a munition;

means for validating the incoming interrogation code;

means for extracting a timing signal from said validated incoming interrogation code;

means for generating an identification code synchronized by said timing signal with said incoming interrogation code; and means for transmitting said synchronized identification code back to said interrogation circuit on board the munition for confirming identification and relative range and speed of the transponder unit.

14. A post launch, identification friend or foe (IFF) fire control system for a munition comprising:

a transponder unit having means for receiving an rf carrier signal containing an incoming interrogation code from a remote interrogation unit on board a munition;

means for validating the incoming interrogation code;

means for extracting a timing signal from said validated incoming interrogation code;

means for generating an identification code synchronized by said timing signal with said incoming interrogation code; and means for transmitting said synchronized identification code back to said interrogation circuit on board the munition for confirming identification and relative range and speed of the transponder unit, said means for transmitting including frequency shifting means for shifting the frequency of said received carrier signal to create a transmit carrier signal, and means for modulating said transmit carrier signal with said synchronized identification code.

15. A post launch, identification friend or foe (IFF) fire control system for a munition comprising:

a transponder unit having means for receiving an rf carrier signal containing an incoming interrogation code from a remote interrogation unit on board a munition;

means for validating the incoming interrogation code;

means for extracting a timing signal from said validated incoming interrogating code;

means for generating an identification code synchronized by said timing signal with said incoming interrogation code; and means for transmitting said synchronized identification code back to said interrogation circuit on board the munition for confirming identification and relative range and speed of the transponder unit including means for transmitting said synchronized identification code back to said interrogation circuit on board the munition at an amplitude approximately inversely proportional to the amplitude a of the rf carrier signal to provide an optimum reply signal level.

16. A post launch, identification friend or foe (IFF) fire control system for a munition comprising:

transponder means;

interrogation means having an identification and ranging interrogation circuit for mounting on a munition including means for transmitting an interrogation code on an rf carrier signal; means for detecting and verifying, in reply to said interrogation code; an incoming identification code from said transponder unit, means for determining the range and velocity to said transponder unit, and means for providing a decision signal to the fire control circuit of the munition to enable friendly target avoidance;

said transponder means having means for receiving an rf carrier signal containing an incoming interrogation code from said interrogation unit on board a munition; means for validating the incoming interrogation code; means for extracting a timing signal from said validated incoming interrogation code; means for generating an identification code synchronized by said timing signal with said incoming interrogation code; and means for transmitting said synchronized identification code back to said interrogation circuit on board the munition for confirming identification and range of the transponder unit.

* * * * *